(12) United States Patent
Makhalov et al.

(10) Patent No.: US 11,689,365 B2
(45) Date of Patent: Jun. 27, 2023

(54) CENTRALIZED VOLUME ENCRYPTION KEY MANAGEMENT FOR EDGE DEVICES WITH TRUSTED PLATFORM MODULES

(71) Applicant: VMware, Inc., Palo Alto, CA (US)

(72) Inventors: Alexey Makhalov, Bellevue, WA (US); Maria Potapova, Bellevue, WA (US); Ravishankar Chamarajnagar, Atlanta, GA (US); Bo Gan, Bellevue, WA (US); Raghunath Krishnamurthy, Atlanta, GA (US); Sharath George, Bellevue, WA (US); Sriram Nambakam, Bellevue, WA (US)

(73) Assignee: VMWARE, INC., Palo Alto, CA (US)

( * ) Notice: Subject to any disclaimer, the term of this patent is extended or adjusted under 35 U.S.C. 154(b) by 716 days.

(21) Appl. No.: 16/661,198

(22) Filed: Oct. 23, 2019

(65) Prior Publication Data
US 2021/0021418 A1     Jan. 21, 2021

Related U.S. Application Data

(60) Provisional application No. 62/875,248, filed on Jul. 17, 2019.

(51) Int. Cl.
*H04L 9/14* (2006.01)
*H04L 9/08* (2006.01)
(Continued)

(52) U.S. Cl.
CPC .............. *H04L 9/14* (2013.01); *G06F 3/067* (2013.01); *G06F 3/0622* (2013.01);
(Continued)

(58) Field of Classification Search
CPC ........ H04L 9/14; H04L 9/0822; H04L 9/0877; H04L 9/3234; H04L 9/08; G06F 3/0622; G06F 3/0653; G06F 3/067
See application file for complete search history.

(56) References Cited

U.S. PATENT DOCUMENTS

| 2007/0073416 A1 | 3/2007 | Grawrock |
| 2008/0244569 A1 | 10/2008 | Challener et al. |

(Continued)

FOREIGN PATENT DOCUMENTS

| CN | 108959943 A | * | 12/2018 | ........... G06F 21/602 |
| KR | 20080050216 A | | 6/2008 | |

OTHER PUBLICATIONS

Machine translation for Liu et al. Chinese application CN 108959943 A (Year: 2018).*

*Primary Examiner* — Jung W Kim
*Assistant Examiner* — Howard H. Louie
(74) *Attorney, Agent, or Firm* — Thomas Horstemeyer, LLP (57) ABSTRACT

The present disclosure relates to centralized volume encryption key management for edge devices with trusted platform modules (TPM)s. In some aspects a volume encryption key is generated for a gateway device. A sealing authorization policy is also generated for the gateway device. The sealing authorization policy is generated based on a predetermined platform configuration register (PCR) mask and expected PCR values. The volume encryption key and the sealing authorization policy are transmitted from the management service to the gateway device to provision the gateway device with the volume encryption key.

20 Claims, 4 Drawing Sheets

(51) Int. Cl.
*H04L 9/32* (2006.01)
*G06F 3/06* (2006.01)

(52) U.S. Cl.
CPC .......... *G06F 3/0653* (2013.01); *H04L 9/0822* (2013.01); *H04L 9/0877* (2013.01); *H04L 9/3234* (2013.01)

(56) References Cited

U.S. PATENT DOCUMENTS

| | | | |
|---|---|---|---|
| 2011/0225451 A1* | 9/2011 | Leggette | H04L 63/10 714/E11.088 |
| 2015/0082399 A1 | 3/2015 | Wu et al. | |
| 2016/0026810 A1 | 1/2016 | Hagiwara et al. | |
| 2017/0237560 A1* | 8/2017 | Mueller | G06F 21/72 713/168 |
| 2018/0004539 A1* | 1/2018 | Liguori | G06F 9/45558 |
| 2019/0103966 A1* | 4/2019 | Zimny | H04W 12/06 |

* cited by examiner

CENTRALIZED VOLUME ENCRYPTION KEY MANAGEMENT FOR EDGE DEVICES WITH TRUSTED PLATFORM MODULES

CROSS-REFERENCE TO RELATED APPLICATIONS

The present application claims priority to, and the benefit of, U.S. Provisional Patent Application No. 62/875,248, filed on Jul. 17, 2019 and entitled "CENTRALIZED VOLUME ENCRYPTION KEY MANAGEMENT FOR EDGE DEVICES WITH TRUSTED PLATFORM MODULES," which is incorporated herein by reference in its entirety.

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data, from theft, data loss, and unauthorized access. In order to access a network, IoT devices can connect through a gateway or another edge device.

Edge devices can facilitate communication between a management service and multiple IoT devices. As a result, the edge device should be a trusted device. Some edge devices can be unattended for long periods of time. The edge device can be in a remote location, or other location with limited access by information technology professionals. In such a limited access location, it can be difficult to ensure that the edge device is uncompromised. For example, it may not be possible to physically inspect the device. Remote tests and diagnostics may not be reliable if the device is compromised.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to centralized volume encryption key management for edge devices with trusted platform modules (TPM)s. Edge devices can be in communication with multiple Internet-of Things (IoT) devices. Edge devices can facilitate communication between a management service and multiple IoT devices. It can be difficult to ensure that an edge device is uncompromised. For example, it may not be possible to physically inspect the device, and remote diagnostics may not be reliable if the device is compromised. As a result, there is a need to secure the storage volumes for edge devices. The present disclosure includes mechanisms by which a management service can manage encryption keys for encryption of edge device storage volumes, which can include the root filesystem.

Figure 1:
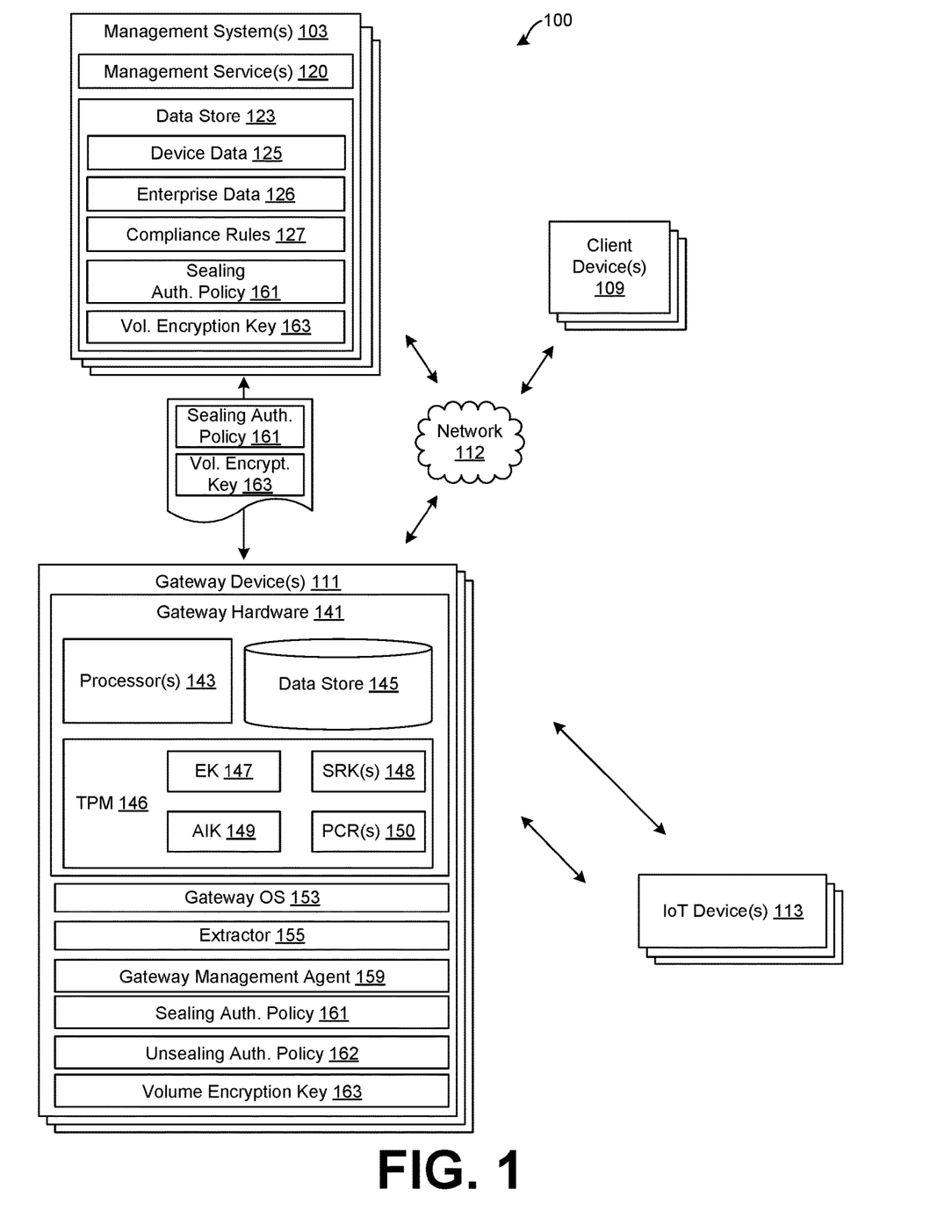
FIG. 1 is a drawing of an example of a networked environment, including a management system, a client device, a gateway, and IoT devices.

With reference to FIG. 1, shown is an example of a networked environment 100. The networked environment 100 can include a management system 103, a client device 109, a gateway device 111, and Internet-of-Things (IoT) devices 113 in communication with one another over a network 112. Internet-of-Things (IoT) devices 113 and other devices can connect to the network 112 through the gateway device 111. The gateway device 111 can communicate with the management service 120 for management of the IoT devices 113 that connect to the network 112 through the gateway device 111. The components of the networked environment 100 can be utilized for trusted platform module secured storage with centralized encryption key management of gateways and other edge devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network, and can be local to at least one of the other components of the networked environment. In other embodiments, the management system 103 can be remote from the other components, or the computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a management service 120 as well as other applications, services, processes, systems, engines, or functionality not discussed in detail herein. The management service 120 can be stored in the data store 123 of the management system 103.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 103, mass storage resources of the management system 103, or any other storage resources on which data can be stored by the management system 103. The data stored in the data store 123 can include, for example, management data including device data 125, enterprise data 126, compliance rules 127, sealing authorization policies 161, and volume encryption keys 163, as well as other data.

The data stored in the data store 123 can be associated with the operation of the various applications and/or functional entities described. Client devices 109, gateway devices 111, and IoT devices 113 can be identified within the device data 125 by one or more of a device identifier, a unique device identifier (UDID), a media access control (MAC) address, an internet protocol (IP) address, or another identifier that uniquely identifies a device with respect to other devices. The device data 125 can include gateway data associated with gateway devices 111 and other edge systems or edge devices through which IoT devices 113 can connect to the network 112. The gateway data can also include specifications, and for each gateway device 111, a type of gateway or a gateway identifier, and other information. Specifications for the gateway device 111 can include hardware configurations including a chipset utilized by the gateway, a performance or capacity, a model identifier, and software configurations, including an agent application installed on the gateway device 111. For example, the configuration can identify an agent such as the gateway management agent 159, or a version of the gateway management agent 159. The gateway data can also include an organizational group.

Device data 125 can include data associated with a configuration of each client device 109, gateway device 111, and IoT device 113, and can include an identifier of the client device 109, gateway device 111, or IoT device 113. The identifier can be a serial number, media access control (MAC) address, other network address, or another device identifier. In addition, the device data 125 can include an enrollment status indicating whether each client device 109, gateway device 111, or IoT device 113 is enrolled with, or managed by, the management service 120. A client device 109, gateway device 111, or IoT device 113 designated as "enrolled" can be permitted to access the enterprise data 126, while a client device 109, gateway device 111, or IoT device 113 designated as "not enrolled," or having no designation, can be denied access to the enterprise data 126.

Additionally, device data 125 can include indications of the state of devices including the client devices 109, gateway devices 111, and IoT devices 113. For instance, these indications can specify applications that are installed on the client devices 109, gateway devices 111, and IoT devices 113; configurations or settings that are applied to each of the devices, user accounts, gateway accounts, or service accounts associated with each of the devices; the physical locations of each of the devices; the network to which each of the devices is connected; and other information describing the current state of each of the devices.

In order for a particular gateway device 111 to communicate with the management service 120, it can be enrolled with the management service 120. This can indicate that the gateway device data of the gateway device 111 is stored in association with a gateway account with the management service 120. In some cases, the enrollment can involve the installation of an enrollment policy on the gateway device 111. The enrollment policy can be transmitted from the management service 120 and installed using the gateway management agent 159. In other cases, the gateway device 111 can receive a token such as a JavaScript Object Notation (JSON), or Web Token (JWT) that can be provided for communication with the management service 120. The gateway device data can include expected states associated with the gateway device 111. The expected states can include expected values of platform configuration registers (PCRs) 150 of the gateway device 111.

While a user account can be associated with a particular person, in some cases a user account can be unassociated with any particular person and can nevertheless be utilized for client devices 109, gateway devices 111, or IoT devices 113 that provide certain functionalities, such as automatic functionalities. For example, a gateway device 111 can be associated with a service account or a gateway account that is unassociated with any person.

Device data 125 can also include data pertaining to user groups. An administrator can specify one or more of the client devices 109, gateway devices 111, and IoT devices 113 as belonging to a user group. The user group can refer to a group of user accounts, which can include gateway accounts. User groups can be created by an administrator of the management service 120 such that a batch of client devices 109, gateway devices 111, and/or IoT devices 113 can be configured according to common settings. For instance, an enterprise can create a user group for the marketing department and the sales department, where client devices 109, gateway devices 111, and/or IoT devices 113 in the marketing department are configured differently from the client devices 109, gateway devices 111, and/or IoT devices 113 in the sales department. Device data 125 associated with a gateway account can be referred to as gateway data.

Compliance rules 127 can include, for example, configurable criteria that must be satisfied for an enrolled one of the client devices 109, gateway devices 111, and IoT devices 113 to be in compliance with the management service 120. The compliance rules 127 can be based on a number of factors, including geographical location, activation status, enrollment status, and authentication data including authentication data obtained by a device registration system, time, and date, and network properties, among other factors associated with each device. The compliance rules can also be determined based on a user account associated with a user. In some cases, a gateway device 111 can be unassociated with a user, but can nevertheless be associated with a service account, a gateway account, or another user account that is unassociated with a user.

Compliance rules 127 can include predefined constraints that must be met in order for the management service 120, or other applications, to permit access to the enterprise data 126 or features of the gateway device 111. The management service 120 can communicate with gateway management agent 159 or other applications to determine whether states exist on the client device 109, gateway device 111, or IoT devices 113 that do not satisfy one or more compliance rules 127. States can include, for example, a virus or malware being detected on the device; violation of a baseline or verified behavior profile; installation or execution of a blacklisted application; and a device being "rooted" or "jailbroken," where root access is provided to a user of the device. Additional states can include the presence of particular files, questionable device configurations, vulnerable versions of applications, vulnerable states of IoT devices 113, including violation of a baseline or verified behavior profile, or other vulnerability, as can be appreciated.

The management service 120 can oversee the management of devices including the client devices 109, gateway devices 111, and IoT devices 113. The management service 120 can oversee security for the gateway devices 111, including management of volume encryption key(s) for each of the gateway devices 111. The management service 120 can provide functionalities using application program interfaces (APIs). To this end, an API of the management service 120 can provide enrollment information regarding a device, such as whether the device is enrolled with the management service 120. APIs or API calls can be provided for other functionalities of the management service 120 as discussed herein. The management service 120 can generate and provide an administrative console or user interface for management of the gateway device 111, other edge devices, and IoT devices 113 that are connected through the edge devices. The user interface of the management service 120 can be accessed through client management application 139, or another application of a client device 109, or can be accessed through a network site provided by the management service 120, or the management service 120. The management service 120 can provide a user interface for setting and viewing alerts and notifications for anomalies in behaviors of a gateway device 111 in communications with IoT devices 113. The alerts and notifications can also be sent to an email address or to a client device 109.

The management service 120 can include a message broker for onboarding and configuration of gateway devices 111 and other edge devices, as well as IoT devices 113. The message broker can utilize Message Queuing Telemetry Transport (MQTT) or another publish-subscribe-based messaging protocol, Advanced Message Queuing Protocol (AMQP), or another messaging protocol.

The management service 120 can also request that the gateway device 111, client device 109, or IoT device 113 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway device 111 check-in with the management service 120. The notification service can push or otherwise route a notification to the gateway device 111. Once the notification is received, the gateway management agent 159 can cause the gateway device 111 to check-in with the management service 120. The gateway management agent 159 can determine whether a command queue provided by the management service 120 for the respective gateway device 111 contains any commands or resources for the gateway device 111, and, if so, can cause the commands or resources to be downloaded and/or implemented on the gateway device 111. A client device 109 can likewise be associated with a command queue and can retrieve and implement commands in response to a request from a notification service.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store that also includes applications, a client management application, and other data. The client device 109 can execute the client management application to perform or access the functionality described for the management service 120. The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile or easily portable from one location to another, such as a smart phone, tablet, or laptop computer. In other situations, the client device 109 can be a desktop machine or a kiosk that is not easily portable. The operating system of the client device 109 can be configured to execute various applications, such as a client management application, a browser application, or another application. The operating system and some applications can access network content served up by the management system 103, or other servers, thereby rendering a user interface on a display, such as a liquid crystal display (LCD), organic light emitting diode (OLED) display, touch-screen display, or other type of display device.

The gateway device 111 can provide network 112 access to the IoT devices 113 as well as gather IoT data based on IoT device 113 communications with the gateway device 111. While referred to as a gateway, the gateway device 111 can also be representative of routing switches, integrated access devices (IADs), multiplexers, a variety of metropolitan area network (MAN) and wide area network (WAN) access devices, and other edge devices. The gateway device 111 can include gateway hardware 141 that includes processor(s) 143 and data store(s) 145. The gateway device 111 can include a hypervisor. The hypervisor can have components and other processes or applications that are installed in, and execute from, the hypervisor. In some cases, the hypervisor and its components can execute in a kernel mode or another privileged mode with respect to the gateway hardware 141 of the gateway device 111. The data store 145 can store a gateway operating system 153, extractor 155, gateway management agent 159, sealing authorization policy 161, and volume encryption key(s) 163 for encryption of one or more volumes of the data store 145. The management service 120 can store expected PCR values of PCRs 150 of the gateway device 111. The management service 120 can generate a sealing authorization policy 161 using a predetermined PCR mask and the expected PCR values of the PCRs 150. The predetermined PCR mask can be a predetermined set of PCRs 150 that are measured for sealing and unsealing the volume encryption key 163. The PCR mask can be a portion of the extractor 155 of the particular gateway device 111. The management service 120 can transmit the sealing authorization policy 161 and the volume encryption key 163 to the gateway management agent 159 on the gateway device 111. The gateway management agent 159 can store and seal the volume encryption key 163 using the sealing authorization policy 161. The sealing authorization policy 161 can be generated using expected or golden (e.g., untampered) PCR values for the gateway device 111 when it is in an expected or untampered state. The volume encryption key 163 can be stored in the non-volatile memory of the TPM 146, or another non-volatile memory that can survive a power cycle.

The TPM 146 can include an endorsement key (EK) 147, a storage root key (SRK) 148, an attestation identity key (AIK) 149, and a number of platform configuration registers (PCRs) 150. The endorsement key 147 can be a private key of an asymmetrical key pair used for endorsement of the gateway device 111. The endorsement key 147 can be a unique, device-specific private key created at manufacturing time or installed by a manufacturer. The endorsement key 147 can be embedded in the TPM 146. In some cases, the endorsement key 147 is stored in nonvolatile memory of the TPM 146. The TPM 146 or gateway device 111 can also include the public endorsement key, for example, in a certificate signed by a certificate authority such as the TPM certificate authority. In some examples, the private endorsement key 147 is not used to generate signatures, so that the public endorsement key is not required to verify signatures, and does not have to be widely distributed. The private endorsement key 147 can then be effectively used to decrypt data that is encrypted using the public endorsement key.

The storage root key 148 can be a private key of an asymmetrical key pair used for implementing encrypted storage. In some examples, the volume encryption key 163 can be a child key of the storage root key 148. In other words, the volume encryption key 163 can be encrypted using a public storage root key and can be unencrypted using the storage root key 148. In some cases, the storage root key 148 is stored in nonvolatile memory of the TPM 146. The management service 120 can verify communications that are signed using the private storage root key 148 are valid, based on a public storage root key available through the management service 120, or a certificate authority such as the TPM certificate authority. The TPM 146 or gateway device 111 can also include the public storage root key, for example, in a certificate signed by the TPM certificate authority.

The attestation identity key 149 can be stored within the TPM 146 or in secure external storage. The attestation identity key 149 can be a private key of an asymmetrical key pair used for attestation and signing. The TPM 146 or gateway device 111 can also include a public attestation identity key, for example, in a certificate signed by a certificate authority such as the TPM certificate authority.

The PCRs 150 can store integrity metrics. The integrity metrics stored in the PCRs 150 are measures of the integrity associated with code, applications, and other data stored in a BIOS, a hard disk, a memory, or another aspect of the data store 145. The measurements can be measured during a boot process or otherwise before the code is executed. PCRs 150 can be implemented in volatile or non-volatile storage. In some examples, the registers are reset whenever the gateway device 111 powers off or re-starts, so that the previous integrity metrics, stored as PCR values, are not mistaken for a current status of the gateway device 111.

The extractor 155 can include code, an application, or other instructions that unseals the volume encryption key 163 for the gateway device 111. The extractor 155 can include an early-boot application or instructions that obtain the volume encryption key 163 from the TPM 146 and uses it to open an encrypted volume of the gateway device 111. The extractor 155 can be measured during the boot process and the measurement can be stored in a PCR 150. This can ensure that the extractor 155 itself is verified during the boot process. The extractor 155 can include a PCR mask. The PCR mask can be a predetermined set of the PCRs 150 that are used for unsealing the volume encryption key 163. The PCR mask can include a PCR 150 containing a measurement of the extractor 155, as well as a number of other PCRs 150. The management service 120 can also store, in the gateway data, a particular PCR mask corresponding to each gateway device 111.

The extractor 155 can communicate with the TPM 146 to build or generate the unsealing authorization policy 162 using the predetermined PCR mask and measured PCR values of the PCRs 150. The volume encryption key 163 can be unsealed if the unsealing authorization policy 162 matches the sealing authorization policy 161. This is because the gateway management agent 159 used the sealing authorization policy 161 in order to seal the volume encryption key 163. The extractor 155 can be stored in a RAMDisk or another memory location of the data store 145. The RAMDisk can refer to a portion of a system random access memory (RAM) that is utilized as a disk drive. A measurement of the extractor 155 is associated with at least one of the PCRs 150, so changes in the extractor 155 would cause the PCR values to change, and the unsealing process would fail. Because the PCR mask is static, the extractor 155 can include the PCR mask.

The gateway management agent 159 can perform management functionalities including enrollment functionalities, product and application installations, and profile installations. These functionalities can include a number of modules or components that perform actions through the gateway device 111, and the gateway management instructions can be updated, upgraded, or otherwise altered throughout the lifecycle of the gateway device 111. The gateway management agent 159 can include a number of components including an IoT Agent for management and communication with IoT devices 113.

The volume encryption key 163 can be associated with the encryption of a secured volume of the gateway device 111. In some cases, the management service 120 and the gateway device 111 can maintain multiple volume encryptions keys 163 for multiple different secured volumes of the gateway device 111. In some examples, the secured volume can include the root filesystem of the gateway device 111. The extractor 155 can load the volume encryption key 163 into a kernel of the gateway device 111 once it is unsealed. The volume encryption key 163 can then remain in the kernel space memory, for example, in dm-crypt subsystem, for the entire uptime of the gateway device 111. The extractor 155 can then extend a predetermined PCR 150 using a predetermined set of information (e.g., 0000). Once the predetermined PCR 150 is extended, the volume encryption key 163 is locked and inaccessible because the PCR values will not match the expected values. In some cases, the volume encryption key 163 can be a symmetrical encryption key that corresponds to volume encryption instructions, specification, or standards, associated with the gateway device 111. For example, the volume encryption key 163 can be a 32-byte symmetrical encryption key or another type of encryption key.

In some cases, the management service 120 can update the gateway operating system 153, BIOS, gateway management agent 159, or other updated gateway instructions of the gateway device 111. This can cause states of the gateway device 111, including PCR values of PCRs 150, to change. The management service 120 can determine an updated set of expected PCR values based on the updated gateway instructions, and can generate an updated sealing authorization policy 161. The management service 120 can also transmit instructions to re-seal the volume encryption key 163 using the updated sealing authorization policy 161.

The management service 120 can also transmit a command to generate a new encrypted volume on the gateway device 111. The management service 120 can transmit a command to the gateway device 111 to seal a new volume encryption key 163. To this end, the management service 120 can transmit an updated sealing authorization policy 161 that is generated based on the expected PCR values updated in response to the changes associated with the new encrypted volume.

The IoT devices 113 can be appliances, vehicles, sensors, controllers, actuators, and other physical devices including at least: a processor, network communication hardware, and a memory including executable instructions for communicating with a gateway device 111. The IoT device 113 can be representative of one or more IoT devices 113. The IoT device 113 can include appliances, vehicles, sensors, controllers, actuators, monitors, phones, tablets, thermostats, speakers, and other devices and can incorporate processor-based systems, such as a computer system or any other device with like capability. The IoT device 113 can have an operating system or other software that can perform functionalities and execute applications. The operating system can be stored in a data store that also includes applications, an IoT management application, and other data. The IoT device 113 can execute the IoT management application to perform or access the functionality described for the management service 120. The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

Figure 2:
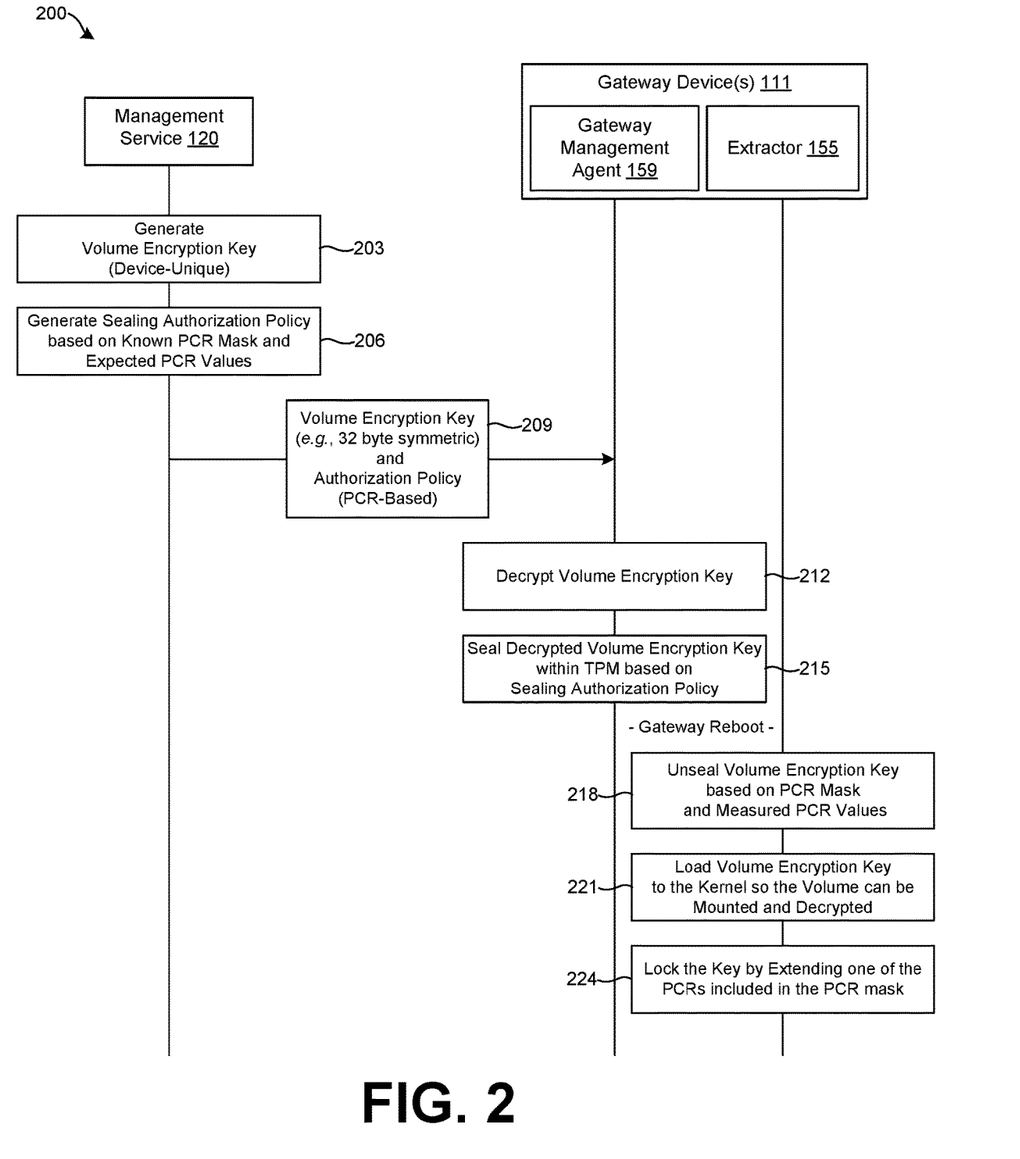
FIG. 2 is an example sequence diagram illustrating functionality implemented by components of the networked environment.

In FIG. 2, shown is an example sequence diagram 200 describing steps that can be performed by the components of the networked environment 100. Generally, the sequence diagram 200 describes how the components use the TPM 146 to secure storage for gateway devices 111, and provide for centralized encryption key management by the management service 120. The process describes how the volume encryption key 163 is provisioned by the management service 120 and later accessed during a boot process. The management service 120 can provision and re-provision the gateway device 111 with updated volume encryption keys 163 any number of times during the uptime of the gateway device 111.

In step 203, the management service 120 can generate a volume encryption key 163. The volume encryption key 163 can be associated with the encryption of a secured volume of the gateway device 111. In some examples, the secured volume can include the root filesystem of the gateway device 111. In some cases, the volume encryption key 163 can be a symmetrical encryption key that corresponds to volume encryption instructions, specification, or standards associated with the gateway device 111. For example, the volume encryption key 163 can be a 32-byte symmetrical encryption key or another type of encryption key.

In step 206, the management service 120 can generate a sealing authorization policy 161. The management service 120 can generate the sealing authorization policy 161 using a PCR mask and expected PCR values of the PCRs 150 of the gateway device 111. The management service 120 can know PCR SHA256 after boot values of the gateway device 111, and can utilize these expected PCR values. The PCR mask can be a predetermined set of PCRs 150 that are measured for sealing and unsealing the volume encryption key 163 for a particular gateway device 111. This should be shared with components of the gateway device 111. For example, the extractor 155 can include the same PCR mask as the management service 120 has stored in association with the particular gateway device 111.

In step 209, the management service 120 can transmit the sealing authorization policy 161 and the volume encryption key 163 to the gateway management agent 159. In some examples, the management service 120 can maintain a command queue for the gateway device 111. The gateway management agent 159 causes the gateway device 111 to check in with the management service 120 and retrieve the contents of the command queue. The command queue can include a command to retrieve the sealing authorization policy 161 and the volume encryption key 163 to the gateway management agent 159 from respective locations or addresses provided for each of these items. This can also be performed in two separate commands or transmissions associated with each of the sealing authorization policy 161 and the volume encryption key 163. While the gateway management agent 159 can retrieve commands from the command queue, this can also be considered; transmitting these commands from the management service 120 to the gateway management agent 159 of the gateway device 111.

The volume encryption key 163 can be encrypted using a public key, or multiple public keys, associated with the private keys of the TPM 146. Private keys of the TPM 146 include the endorsement key 147, the storage root key 148, and the attestation identity key 149. For example, the volume encryption key 163 can be a child key of the storage root key 148, and can be encrypted using a public storage root key corresponding to the private storage root key 148. In some cases, the volume encryption key 163 can be encrypted using multiple ones of the private keys of the TPM 146. The "make credential" operation can be utilized to encrypt or otherwise protect the volume encryption key 163. This operation can be associated with a TPM specification of the TPM 146.

In step 212, the gateway management agent 159 can decrypt the volume encryption key 163. For example, the gateway management agent 159 can decrypt the volume encryption key 163 using the private storage root key 148. In some cases, the volume encryption key 163 can be decrypted using multiple ones of the private keys of the TPM 146. The gateway management agent 159 can utilize an "activate credential" TPM operation to decrypt or decode the volume encryption key 163. This operation can be associated with a TPM specification of the TPM 146.

In step 215, the gateway management agent 159 can seal the volume encryption key 163 using the sealing authorization policy 161. Once sealed, the volume encryption key 163 can be used on the next boot cycle of the gateway device 111.

The gateway device 111 can reboot. In some cases, the gateway can check in with the management service 120 and retrieve a command in a command queue associated with the gateway device 111. The command can include a command to reboot the gateway device 111. In other cases, the gateway device 111 can reboot in response to a power fluctuation, a command to update the gateway device 111, or another reason.

In step 218, the extractor 155 can unseal the volume encryption key 163. This can be performed during a boot process of the gateway device 111, without any network connection or other connection to the management service 120, and without user interaction or input. The extractor 155 can include a PCR mask of a predetermined set of the PCRs 150 that are used for unsealing the volume encryption key 163. The PCR mask can include a PCR 150 containing a measurement of the extractor 155, as well as a number of other PCRs 150. The extractor 155 can communicate with the TPM 146 to generate the unsealing authorization policy 162 using the predetermined PCR mask and measured PCR values of the PCRs 150. The measured PCR values of the PCRs 150 can be based on measurements performed during the boot process of the gateway device 111. The volume encryption key 163 can be unsealed if the unsealing authorization policy 162 matches the sealing authorization policy 161. This is because the gateway management agent 159 used the sealing authorization policy 161 in order to seal the volume encryption key 163.

In step 221, the extractor 155 can load the volume encryption key 163 which is loaded into kernel space of the gateway device 111. Once the volume encryption key 163 is loaded into kernel space, a volume of the data store 145 can be unencrypted using the volume encryption key 163.

For example, encryption and decryption instructions can have access to the volume encryption key 163 once it is loaded into kernel space. These instructions can unencrypt the volume of the gateway device 111, which can include a root filesystem of the gateway device 111. The volume can then be accessed by the gateway operating system 153, the gateway management agent 159, and other applications and instructions of the gateway device 111.

In step 224, the extractor 155 can extend a predetermined PCR 150 using a predetermined set of information (e.g., 0000). Once the predetermined PCR 150 is extended, the volume encryption key 163 can be locked and inaccessible because the PCR values do not match the expected values. This can limit access to the volume encryption key 163 to a period of time that starts once the measurements for PCRs 150, including a location of the extractor 155, are measured, and stops volume encryption key 163 is locked by extending a PCR 150.

Figure 3:
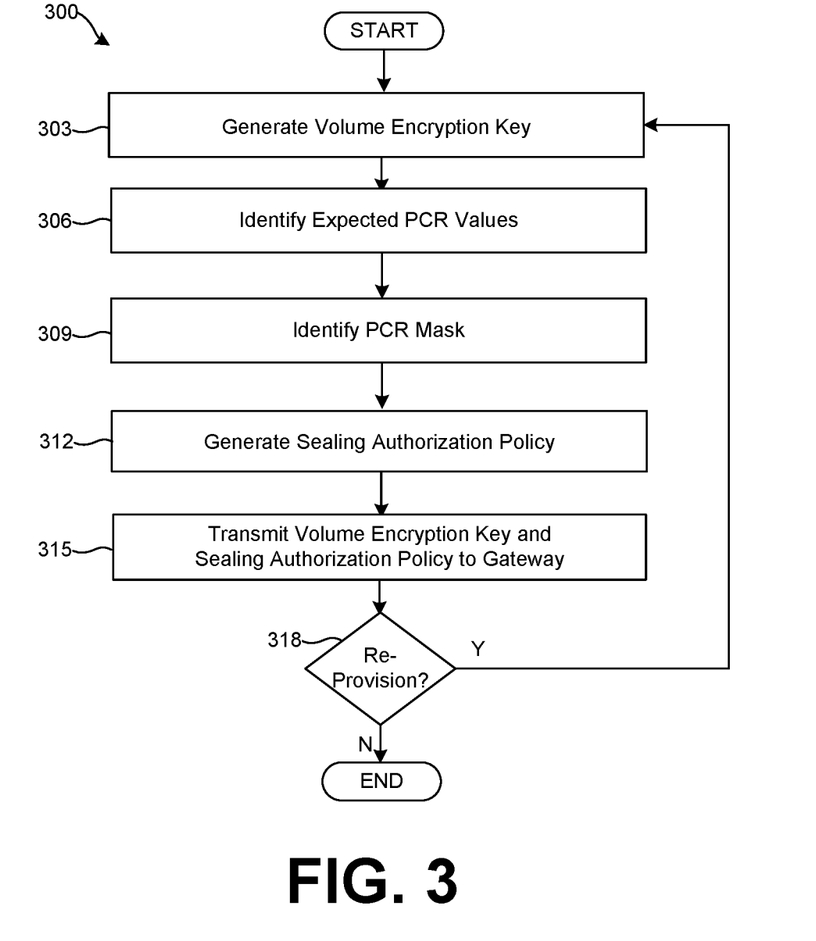
FIG. 3 is a flow chart that illustrates functionality implemented by the management system.

FIG. 3 shows an example flowchart 300 describing steps that can be performed by instructions executed and performed by the management system 103. Generally, the flowchart 300 describes how the management service 120 coordinates and encryption key management for gateway devices 111.

In step 303, the management service 120 can generate a volume encryption key 163. The volume encryption key 163 can be associated with the encryption of a secured volume of the gateway device 111. The volume encryption key 163 can be a symmetrical encryption key that corresponds to volume encryption instructions, specification, or standards associated with the gateway device 111.

The volume encryption key 163 can be encrypted using a public key, or multiple public keys, associated with the private keys of the TPM 146. Private keys of the TPM 146 include the endorsement key 147, the storage root key 148, and the attestation identity key 149. For example, the volume encryption key 163 can be a child key of the storage root key 148, and can be encrypted using a public storage root key corresponding to the private storage root key 148. In some cases, the volume encryption key 163 can be encrypted using multiple ones of the private keys of the TPM 146. The "make credential" operation to encrypt or otherwise protect the volume encryption key 163. This operation can be associated with a TPM specification of the TPM 146.

In step 306, the management service 120 can identify expected PCR values of the gateway device 111. The expected PCR values can be expected PCR values for PCRs 150 for a particular gateway device 111 in a predetermined or expected state. The management service 120 can maintain a record that includes the expected PCR values for a particular gateway device 111 model, and each software configuration for the particular gateway device 111 model. The management service 120 can identify the expected PCR values based on the model and software configuration in a gateway account with the management service 120 for the gateway device 111.

In step 309, the management service 120 can identify a PCR mask. The PCR mask can be a predetermined set of PCRs 150 that are to be measured by the TPM 146 for sealing and unsealing the volume encryption key 163. The PCR mask can be shared with the gateway device 111. For example, a gateway account with the management service 120 can include a PCR mask that matches a PCR mask included in the extractor 155 that is installed on the gateway device 111. The management service 120 can maintain a record that includes the PCR mask for a particular gateway device 111, or for its model and software configuration. The management service 120 can identify the PCR mask based on a gateway account with the management service 120 for the gateway device 111.

In step 312, the management service 120 can generate a sealing authorization policy 161. The management service 120 can generate the sealing authorization policy 161 using the PCR mask and expected PCR values identified for the particular gateway device 111. The extractor 155 can include the same PCR mask as the management service 120 has stored in association with the particular gateway device 111.

In step 315, the management service 120 can transmit the sealing authorization policy 161 and the volume encryption key 163 to the gateway management agent 159. In some examples, the management service 120 can maintain a command queue for the gateway device 111. The gateway management agent 159 causes the gateway device 111 to check in with the management service 120 and retrieve the contents of the command queue. The command queue can include a command to retrieve the sealing authorization policy 161 and the volume encryption key 163 to the gateway management agent 159 from respective locations or addresses provided for each of these items. This can also be performed in two separate commands or transmissions associated with each of the sealing authorization policy 161 and the volume encryption key 163. While the gateway management agent 159 can retrieve commands from the command queue, this can also be considered; transmitting these commands from the management service 120 to the gateway management agent 159 of the gateway device 111.

In step 318, the management service 120 can determine whether to re-provision the volume encryption key 163 for the gateway device 111. For example, the management service 120 can re-provision the gateway device 111 with a new volume encryption key 163 periodically or on a predetermined schedule. In other cases, the volume encryption key 163 can be generated in response to a user input identified in a user interface generated by the management service 120. The management service 120 can also re-provision the gateway device 111 with a new volume encryption key 163 in response to a security alert identified for the gateway device 111. If the management service 120 determines to re-provision the volume encryption key 163 for the gateway device 111, the process can move to step 303.

Figure 4:
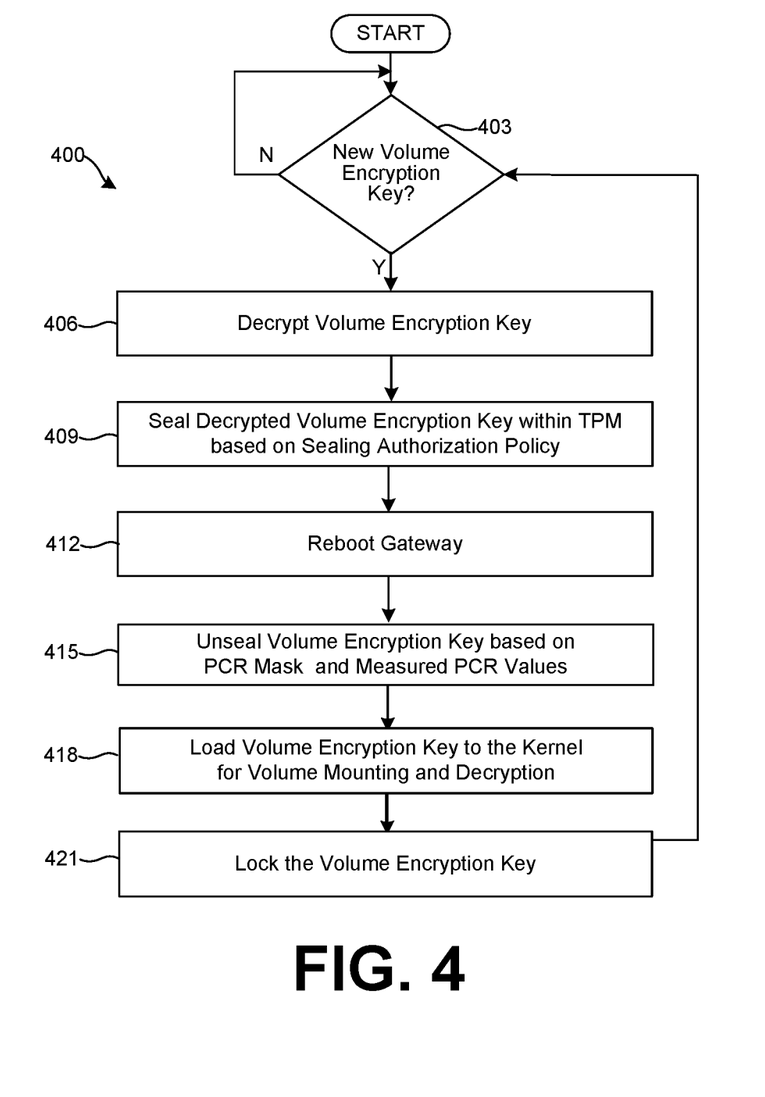
FIG. 4 is a flow chart that illustrates functionality implemented by the gateway.

FIG. 4 shows an example flowchart 400 describing steps that can be performed by instructions executed and performed by the gateway device 111. Generally, the flowchart 400 describes how the gateway device 111 uses the TPM 146 to secure its storage using volume encryption keys 163 that are received from the management service 120.

In step 403, the gateway management agent 159 can receive a volume encryption key 163. The volume encryption key 163 can be received from the management service 120 with which the gateway device 111 is enrolled. The gateway management agent 159 can also receive a sealing authorization policy 161 from the management service 120. The volume encryption key 163 and the sealing authorization policy 161 can be received together or separately.

For example, the management service 120 can maintain a command queue for the gateway devices 111 that are enrolled with the management service 120. The gateway management agent 159 can check in with the management service 120 and retrieve the contents of the command queue. The command queue can include a command to retrieve the sealing authorization policy 161 and the volume encryption key 163. The command can include a network address from which the sealing authorization policy 161 can be downloaded or retrieved. The command can also include a network address from which the volume encryption key 163 can be downloaded or retrieved. The command can be considered an encryption key provisioning command. If no volume encryption key or encryption key provisioning command is received, the gateway management agent 159 can continue normal operation. Once a new volume encryption key 163 is received, the process can move to step 212.

In step 406, the gateway management agent 159 can decrypt the volume encryption key 163. For example, the gateway management agent 159 can decrypt the volume encryption key 163 using the private storage root key 148. In some cases, the volume encryption key 163 can be decrypted using multiple ones of the private keys of the TPM 146. The gateway management agent 159 can utilize an "activate credential" TPM operation to decrypt or decode the volume encryption key 163. This operation can be associated with a TPM specification of the TPM 146.

In step 409, the gateway management agent 159 can seal the volume encryption key 163 using the sealing authorization policy 161. Sealing the volume encryption key 163 using the sealing authorization policy 161 can cause the key to be tied to measurements of PCRs 150 performed by the TPM 146. The sealing authorization policy 161 can be generated by the management service 120 using expected PCR values for the gateway device 111. As a result, the volume encryption key 163 can only be unsealed when the measurements match expected values, indicating that the gateway device 111 is in an expected or untampered state. Once sealed, the volume encryption key 163 can be used on the next boot cycle of the gateway device 111.

In step 412, the gateway device 111 can reboot. In some cases, the gateway management agent 159 can check in with the management service 120 and retrieve a command in a command queue associated with the gateway device 111. The command can include a command to reboot the gateway device 111. In other cases, the gateway device 111 can reboot in response to a power fluctuation, a command to update the gateway device 111, or another reason.

In step 415, the extractor 155 can unseal the volume encryption key 163. This can be performed during a boot process of the gateway device 111, without any network connection or other connection to the management service 120, and without user interaction or input. The extractor 155 can include a PCR mask of a predetermined set of the PCRs 150 that are used for unsealing the volume encryption key 163. The PCR mask can include a PCR 150 containing a measurement of the extractor 155, as well as a number of other PCRs 150. The extractor 155 can communicate with the TPM 146 to generate the unsealing authorization policy 162 using the predetermined PCR mask and measured PCR values of the PCRs 150. The measured PCR values of the PCRs 150 can be based on measurements performed during the boot process of the gateway device 111. The volume encryption key 163 can be unsealed if the unsealing authorization policy 162 matches the sealing authorization policy 161. This is because the gateway management agent 159 used the sealing authorization policy 161 in order to seal the volume encryption key 163.

In step 418, the extractor 155 can load the volume encryption key 163 which is loaded into kernel space of the gateway device 111. Once the volume encryption key 163 is loaded into the kernel space, the volume of the data store 145 can be unencrypted using the volume encryption key 163. For example, encryption and decryption instructions can have access to the volume encryption key 163 once it is loaded into kernel space. These instructions can unencrypt the volume of the gateway device 111, which can include a root filesystem of the gateway device 111. The volume can then be accessed by the gateway operating system 153, the gateway management agent 159, and other applications and instructions of the gateway device 111.

In step 421, the extractor 155 can extend a predetermined PCR 150 using a predetermined set of information (e.g., 0000). Once the predetermined PCR 150 is extended, the volume encryption key 163 can be locked and inaccessible because the PCR values do not match the expected values. This can limit access to the volume encryption key 163 to a period of time that starts once the measurements for PCRs 150, including a location of the extractor 155, are measured, and stops the volume encryption key 163 which is locked by extending a PCR 150.

A number of software components are stored in the memory and executable by a processor. In this respect, the term "executable" means a program file that is in a form that can ultimately be run by the processor. Examples of executable programs can include, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by a management service 120 or another application can be rendered. In some examples, the user interface can be generated with user interface data provided by the management system 103. The client devices 109 can also include one or more input/output devices that can include, for example, a capacitive touchscreen or other type of touch input device, fingerprint reader, or keyboard.

Although the management service 120 and other services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions on an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable, computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
at least one computing device; and
at least one data store comprising instructions executable in the at least one computing device, wherein the instructions, when executed by at least one processor, cause the at least one computing device to at least:
generate, by a management service, a volume encryption key for a gateway device that is associated with a gateway-specific account with the management service that stores gateway data for the gateway device;
store, by the management service, in the gateway-specific account, a predetermined platform configuration register (PCR) mask that is identified based on a particular gateway model of the gateway device, the predetermined PCR mask specifying at least one PCR that measures extractor code of the gateway device that unseals volume encryption keys;
generate, by the management service, a sealing authorization policy based on the predetermined PCR mask and expected PCR values, wherein the management service identifies the predetermined PCR mask based on the gateway-specific account; and
transmit, from the management service to the gateway device, a command to seal the volume encryption key in a non-volatile memory of a trusted platform module (TPM) of the gateway device based on the predetermined PCR mask and the expected PCR values.

2. The system of claim 1, wherein the instructions, when executed by the at least one processor, cause the at least one computing device to at least:
unseal, by the extractor code of the gateway device, the volume encryption key, the volume encryption key being unsealed based on the predetermined PCR mask and measured PCR values that are measured during a boot process of the gateway device, wherein the TPM measures the at least one PCR corresponding to the extractor code during the boot process, and the extractor code verifies the at least one PCR to ensure that the extractor code is verified.

3. The system of claim 2, wherein the instructions, when executed by the at least one processor, cause the at least one computing device to at least:
load, by the extractor code of the gateway device, the volume encryption key to a kernel of the gateway device to enable decryption of a storage volume of the gateway device.

4. The system of claim 2, wherein the measured PCR values match the expected PCR values.

5. The system of claim 1, wherein the expected PCR values are associated with an untampered state of the gateway device.

6. The system of claim 1, wherein the predetermined PCR mask comprises a plurality of PCRs.

7. The system of claim 1, wherein the predetermined PCR mask is included in each of the management service and extractor code of the gateway device.

8. A method performed by instructions executed by at least one computing device, the method comprising:
generating, by a management service, a volume encryption key for a gateway device that is associated with a gateway-specific account with the management service;
storing, in the gateway-specific account, a predetermined platform configuration register (PCR) mask that is identified based on a particular gateway model of the gateway device, the predetermined PCR mask specifying at least one PCR that measures extractor code of the gateway device that unseals volume encryption keys;
generating, by the management service, a sealing authorization policy based on the predetermined PCR mask and expected PCR values, wherein the management service identifies the predetermined PCR mask based on the gateway-specific account; and
transmitting, from the management service to the gateway device, a command to seal the volume encryption key in a non-volatile memory of a trusted platform module (TPM) of the gateway device based on the predetermined PCR mask and the expected PCR values.

9. The method of claim 8, further comprising:
unsealing, by the extractor code of the gateway device, the volume encryption key, the volume encryption key being unsealed based on the predetermined PCR mask and measured PCR values that are measured during a boot process of the gateway device, wherein the TPM measures the at least one PCR corresponding to the extractor code during the boot process, and the extractor code verifies the at least one PCR to ensure that the extractor code is verified.

10. The method of claim 9, further comprising:
loading, by the extractor code of the gateway device, the volume encryption key to a kernel of the gateway device to enable decryption of a storage volume of the gateway device.

11. The method of claim 9, wherein the measured PCR values match the expected PCR values.

12. The method of claim 8, wherein the expected PCR values are associated with an untampered state of the gateway device.

13. The method of claim 8, wherein the predetermined PCR mask comprises a plurality of PCRs.

14. The method of claim 8, wherein the predetermined PCR mask is included in each of the management service and extractor code of the gateway device.

15. A non-transitory computer-readable medium comprising instructions executable by at least one computing device, wherein the instructions, when executed by at least one processor, cause the at least one computing device to at least:
generate, by a management service, a volume encryption key for a gateway device that is associated with a gateway-specific account with the management service;
store, in the gateway-specific account, a predetermined platform configuration register (PCR) mask that specifies at least one PCR that measures an extractor of the gateway device that unseals volume encryption keys;
generate, by the management service, a sealing authorization policy based on the predetermined PCR mask and expected PCR values, wherein the management service identifies the predetermined PCR mask based on the gateway-specific account; and
transmit, from the management service to the gateway device, a command to seal the volume encryption key in a non-volatile memory of a trusted platform module (TPM) of the gateway device based on the predetermined PCR mask and the expected PCR values.

16. The non-transitory computer-readable medium of claim 15, wherein the instructions, when executed by the at least one processor, cause the at least one computing device to at least:
unseal, by the extractor code of the gateway device, the volume encryption key, the volume encryption key being unsealed based on the predetermined PCR mask and measured PCR values that are measured during a boot process of the gateway device, wherein the TPM measures the at least one PCR corresponding to the extractor code during the boot process, and the extractor code verifies the at least one PCR to ensure that the extractor code is verified.

17. The non-transitory computer-readable medium of claim 16, wherein the instructions, when executed by the at least one processor, cause the at least one computing device to at least:
load, by the extractor code of the gateway device, the volume encryption key to a kernel of the gateway device to enable decryption of a storage volume of the gateway device.

18. The non-transitory computer-readable medium of claim 16, wherein the measured PCR values match the expected PCR values.

19. The non-transitory computer-readable medium of claim 15, wherein the expected PCR values are associated with an untampered state of the gateway device.

20. The non-transitory computer-readable medium of claim 15, wherein the predetermined PCR mask comprises a plurality of PCRs.

* * * * *